US012302472B2

(12) United States Patent
Wendt et al.

(10) Patent No.: US 12,302,472 B2
(45) Date of Patent: May 13, 2025

(54) METHOD AND SYSTEM FOR SUPPORTING SERVICEABILITY OF LUMINAIRES

(71) Applicant: SIGNIFY HOLDING B.V., Eindhoven (NL)

(72) Inventors: Matthias Wendt, Wurselen (DE); Martinus Petrus Creusen, Wijlre (NL); Haimin Tao, Eindhoven (NL); Bernd Ackermann, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 19 days.

(21) Appl. No.: 17/926,221

(22) PCT Filed: May 25, 2021

(86) PCT No.: PCT/EP2021/063778
§ 371 (c)(1),
(2) Date: Nov. 18, 2022

(87) PCT Pub. No.: WO2021/239672
PCT Pub. Date: Dec. 2, 2021

(65) Prior Publication Data

US 2023/0189421 A1 Jun. 15, 2023

(30) Foreign Application Priority Data

May 29, 2020 (EP) .................................... 20177301

(51) Int. Cl.

*H05B 47/00* (2020.01)
*H05B 47/155* (2020.01)
*H05B 47/175* (2020.01)
*H05B 47/18* (2020.01)
*H05B 47/19* (2020.01)
*H05B 47/20* (2020.01)
*H05B 45/50* (2022.01)

(52) U.S. Cl.

CPC ......... *H05B 47/175* (2020.01); *H05B 47/155* (2020.01); *H05B 47/18* (2020.01); *H05B 47/19* (2020.01); *H05B 47/20* (2020.01); *H05B 45/50* (2020.01)

(58) Field of Classification Search

CPC .... H05B 47/175; H05B 47/155; H05B 47/18; H05B 47/19; H05B 47/20; H05B 45/50; H05B 47/14

See application file for complete search history.

(56) References Cited

U.S. PATENT DOCUMENTS

| | | | | |
|---|---|---|---|---|
| 2002/0065583 | A1 | 5/2002 | Okada et al. | |
| 2012/0242506 | A1 | 9/2012 | Nguyen et al. | |
| 2013/0320874 | A1 | 12/2013 | Dobler | |
| 2014/0252982 | A1 | 9/2014 | Schmitz et al. | |
| 2014/0265919 | A1 | 9/2014 | Pope et al. | |
| 2016/0212807 | A1 * | 7/2016 | Eberson ............. | H05B 45/3725 |
| 2018/0295689 | A1 | 10/2018 | Bandel | |

* cited by examiner

*Primary Examiner* — Tuan T Lam

(57) ABSTRACT

The invention relates to an integration of a programmable memory device in a luminaire for storing service-related information such as drive parameters, repair history information and the like. The memory device can be read out by the same connectivity used for driving the luminaire, so that the driver can be informed about required operation conditions. The driver can thus learn about the service-related information before starting to drive the luminaire.

8 Claims, 4 Drawing Sheets

METHOD AND SYSTEM FOR SUPPORTING SERVICEABILITY OF LUMINAIRES

CROSS-REFERENCE TO PRIOR APPLICATIONS

This application is the U.S. National Phase application under 35 U.S.C. § 371 of International Application No. PCT/EP2021/063778, filed on May 25, 2021, which claims the benefit of European Patent Application No. 20177301.7, filed on May 29, 2020. These applications are hereby incorporated by reference herein.

FIELD OF THE INVENTION

The invention relates to the field of lighting systems, such as—but not limited to—solid-state lighting systems, for use in various different applications for home, office, retail, hospitality and industry.

BACKGROUND OF THE INVENTION

Throughout the following disclosure, a luminaire is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics with a light source and a fiber core or "light pipe" for guiding light generated by the light source.

During service or upgrade actions often luminaire drivers (e.g. current drivers for light emitting diodes (LED)) or luminaire modules (e.g. LED modules also called "L2 (Level 2) boards" or the like) may need to be exchanged. Such luminaire modules may be used as carriers for light sources (e.g. LEDs) and may be manufactured as printed circuit boards (PCBs) either from typical PCB materials like FR4, flex-on-rigid or on MCPCB (Metal clad PCB) carriers for enhanced cooling.

One of the major issues when it comes to exchanging luminaire drivers or modules is that the new combination has to be functioning properly. Which either needs stock keeping of obsolete components over service life or selection of appropriate sources for old components and/or modules.

Typically, the light output of a luminaire module depends on the driving current (set by the driver) and the efficiency level of the luminaire module. In case of exchanging an existing luminaire module with an improved one (e.g. higher efficiency), the driving current should be adapted to ensure that the same light output is generated as with the original module. In conventional lighting systems, the luminaire driver does not change the driving current when a luminaire module is replaced and reprogramming of the luminaire driver by a user would be too complex. As a result, introduction of a luminaire module with higher efficiency will generate a light output that may be too high.

Additionally, in many cases, repairing a luminaire is hindered by unknown drive parameters when a driver has to be exchanged.

SUMMARY OF THE INVENTION

It is an object of the present invention to provide improved serviceability for lighting systems when drivers and/or modules are replaced.

According to a first aspect, a luminaire module comprises:

- a memory element for storing lighting system related information; and
- an interface circuit for providing access to the memory element for a driver of the luminaire module;
- wherein the interface circuit is configured to provide access to the memory element by coupling the memory element to at least one connection line connectable to the driver, wherein the driver is for driving at least one light source of the luminaire module via the one connection line.

A single connection line can be used to provide an interconnection between a driver, a memory element and at least one light source. The driver can be used to provide a power for driving the at least one light source. On the same wiring, the driver can also perform a read out mode for reading out the memory element.

Furthermore, according to a second aspect, a method of controlling a driver in a lighting system is provided, wherein the method comprises:

- checking at least one connection line connecting the driver to a luminaire module for presence of an active memory element; and
- setting the driver into a memory access mode for reading lighting system related information from the memory element via the at least one connection line in response to the checking result.

Accordingly, serviceability of luminaire modules can be improved by reading lighting system related information (such as servicing information (e.g. driving parameters), commissioning information, article number information (e.g. EAN), lamp identifiers, node names or IP addresses for networked lighting systems etc.) from the memory element provided on the luminaire module without requiring any new connection lines or connectors between the driver and the luminaire module. The lighting system related information stored in the memory element can be forwarded to (e.g. read by) a new driver after a driver replacement or to an existing driver after replacement of the luminaire module (the luminaire board can also be a replaceable spare part). Availability and automatic read-out of the lighting system related information allows an exchange of the luminaire module in the field by a non-expert user.

According to a first option of the first or second aspect, the lighting system related information may comprise driving parameters for at least one of the luminaire module and the at least one light source. Thereby, the driving parameters can be read out by the driver after a replacement of the whole module or a placement of one or more light sources.

According to a second option of the first aspect, which may be combined with the first option, the memory element, the interface circuit and the at least one light source may be connected in parallel. Thereby, the luminaire module can be enhanced by simply connecting the interface circuit and the memory element in parallel to the connecting lines between the driver and the luminaire module.

According to a third option of the first aspect, which may be combined with the first or second option, the interface circuit may comprise an isolating element configured to isolate the memory element from the at least one light source during a driving mode for driving the at least one light source. Thus, the driving and memory access modes of the driver can be performed via the same connecting lines, while the isolation element ensures that the memory element is protected from the higher driving power.

According to a fourth option, the isolating element may comprise at least one of a fuse (e.g. one-time fuse or electronically or mechanically resettable fuse), a voltage-controlled switch and a coupling capacitor. Thereby, the isolation can be achieved by simple circuit elements to thereby provide an enhanced luminaire module with low circuit complexity.

According to a fifth option of the first aspect, which may be combined with any one of the first to fourth options, the interface circuit may comprise a voltage-limiting element (e.g. Zener diode) connected in parallel to the memory element. This measure ensures that the memory element is protected from high voltages during the driving mode of the driver.

According to a sixth option of the first aspect, which may be combined with any one of the first to fifth options, the luminaire module may further comprise a wireless communication unit for writing wirelessly received information to the memory element or for wirelessly transmitting information read from the memory element. Thereby, the memory element can be accessed wirelessly to enable remote programming or reading without mechanical access to the luminaire module. As an example, such a wireless access may be performed by a mobile user device during a commissioning phase of the luminaire module.

According to a seventh option of the first or second aspect, which may be combined with any one of the first to sixth options, the memory element may be a low-voltage device, in particular a 1-Wire device, with a voltage range below the driving voltage of the driver. Thus, the memory access mode can be distinguished from the driving mode by a lower voltage range. Furthermore, in case the memory element is a 1-Wire device, only one connection line is required for the memory access.

According to a third aspect (which is directed to the driver side), an apparatus for controlling a driver of a luminaire module in a lighting system is provided, wherein the apparatus is configured to check at least one connection line connecting the driver to the luminaire module for presence of an active memory element and to set the driver into a memory access mode for reading lighting system related information from the memory element via the at least one connection line in response to the checking result.

Thereby, in addition to the above advantages, the lighting module can be checked by the driver and the driver can automatically derive driving parameters from the read lighting system related information for an adequate driving performance.

According to a first option of the third aspect, which can be combined with any of the first to seventh options of the first or second aspects, the apparatus may be configured to set the driver into the memory access mode during a start-up phase of the driver. Thus, the memory element of luminaire device is automatically read by the driver when power is supplied to the driver and the start-up process is initiated.

According to a fourth aspect, a driver is provided, that comprises an apparatus according to the third aspect.

According to a fifth aspect, a lighting system is provided, that comprises at least one driver according to the fourth aspect and at least one luminaire module according to the first aspect.

According to a sixth aspect, a computer program product is provided, which comprises code means for producing the steps of the above method of the second aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
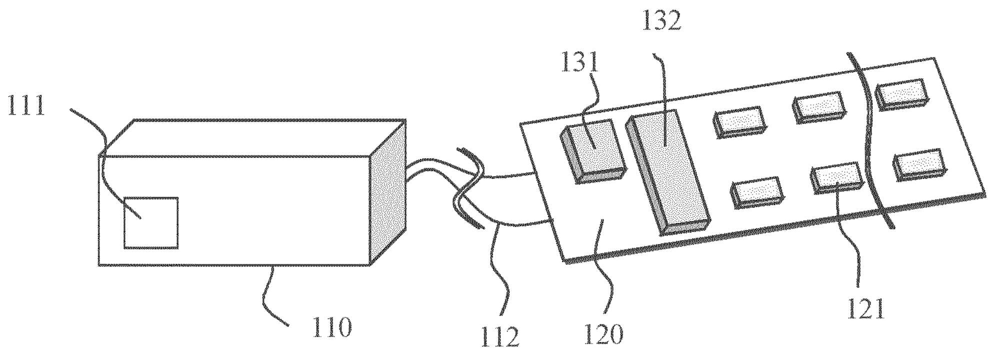
FIG. 1 shows schematically a block diagram of a luminaire system with a driver and an enhanced luminaire module according to various embodiments.

Various embodiments of the present invention are now described based on luminaires of a solid-state lighting system. Solid-state lighting (SSL) is a type of lighting that uses semiconductor light-emitting diodes (LEDs), semiconductor lasers, vertical-cavity surface emitting lasers (VCSELs), organic light-emitting diodes (OLED), or polymer light-emitting diodes (PLED) as sources of illumination or light sources rather than electrical filaments, plasma (used in arc lamps such as fluorescent lamps), or gas. Furthermore, solid-state electroluminescence may be used in SSL as opposed to incandescent bulbs (which use thermal radiation) or fluorescent tubes. Compared to incandescent lighting, SSL creates visible light with reduced heat generation and less energy dissipation. Moreover, white LEDs may convert blue light from a solid-state device to an (approximate) white light spectrum using photoluminescence, the same principle used in conventional fluorescent tubes.

The following embodiments are directed to LED luminaires. It is however mentioned that the present invention can be used for any kind of luminaires to enhance their serviceability.

A driver is an electrical device that regulates the power to an LED or string(s) of LEDs. The driver may respond to changing needs of the LED by supplying a constant amount of power to the LED as its electrical properties change with the temperature. The driver is important because LEDs require very specific electrical power in order to operate properly. If the voltage supplied to the LED is lower than required, very little current runs through the junction, resulting in low light and poor performance. On the other hand, if the voltage is too high, too much current flows to the LED and it can overheat and be severely damaged or fail completely (thermal runaway). This certainly applies to other kinds of luminaires as well.

According to various embodiments, a programmable memory device is integrated in a luminaire module which may be a circuit board (e.g. an L2 board) or an integrated circuit or the like, on or in which at least one light source of the luminaire is arranged. The memory cells of the programmable memory can among others be used to store drive parameters, repair history information or other lighting system related information to enhance serviceability of the luminaire. The programmable memory device may be a random access memory (RAM), a non-volatile RAM (NVRAM), a read-only memory (ROM), a programmable ROM (PROM), an erasable PROM (EPROM), an electrically erasable PROM (EEPROM), a flash EPROM or the like.

In an example, the luminaire module may be configured to allow utilizing the connection lines (e.g. two wires) which are also used for driving the luminaire module.

Various embodiments of drivers and luminaire modules with respective communication interface circuitries are introduced in the following, wherein the luminaire module is enabled to inform the driver about various service parameters, e.g., required operation conditions. The driver may thus learn about these service parameters before starting to drive a new or replaced luminaire module which may be accessible e.g. through a conventional two-pin connection to the driver.

FIG. 1 shows schematically a block diagram of a luminaire system with a driver 110 and an enhanced luminaire module 120 (e.g. a level two (L2) board or the like) according to various embodiments.

It is noted that—throughout the present disclosure—the structure and/or function of blocks or circuit components with identical reference numbers that have been described before are not described again, unless an additional specific functionality is involved. Moreover, only those structural elements and functions are shown, which are useful to understand the embodiments. Other structural elements and functions are omitted for brevity reasons.

In the exemplary embodiment of FIG. 1, the driver 110 is connected to the luminaire module 120 via two connection lines or wires 112. The luminaire module holds a plurality of solid-state light sources (e.g. LEDs) 121 and in addition a programmable memory element 132 and an interfacing circuit 131 for addressing individual memory cells or groups of memory cells to write into or read from the memory element 132 and to drive the light sources 121.

Furthermore, the driver 110 may comprise a user interface and/or input port 111 for setting driver parameters for and/or supplying power to the driver 110.

In an example, the connection technology between the driver 110 and the luminaire module 120 to access additional components (e.g. the programmable memory element 132 and the interfacing circuit 131) mounted on the luminaire module 120 may be a 1-Wire (OneWire) technology which allows using the driving wires 112 also for memory operations (e.g. reading, writing etc.) of the programmable memory element 132. 1-Wire is a device communications bus system that provides low-speed transmission (e.g. 16.3 kbit/s) of data and signaling and power supply over a single conductor. It is similar in concept to I2C, but with lower data rates and longer range. One distinctive feature of the bus is the possibility of using only two wires 112, i.e., data and ground. The 1-Wire communication may be initiated by a master (e.g. the driver 110) and the 1-Wire protocol uses voltages between 0 and 5V. The logical high level (5V) can be impressed on the master side (e.g. at the driver 110) by means of a pull-up resistor connected between the data wire of driving wires 112 and a reference voltage (e.g. supply voltage). Master device (e.g. driver 110) and slave device(s) (e.g. luminaire module 120) may utilize open drain or open collector switches to pull down the data wire of the driving wires 112. All information may be carried in a fixed timing scheme.

Other serial or parallel communication bus technologies may certainly be used as well to provide the connectivity between the driver 110 and the luminaire module 120 with the interface circuit 131 and the programmable memory element 132. These can be Inter-Integrated Circuit (I2C), Digital Addressable Lighting Interface (DALI), HyperTransport, Peripheral Component Interconnect (PCI), Advanced Technology Attachment (ATA), Serial Peripheral Interface (SPI), UNI/O, SMBus, Controller Area Network (CAN), ExpressCard, Fieldbus, FireWire, RS-232, RS-485, Thunderbolt, Small Computer System Interface (SCSI), Scalable Coherent Interface (SCI), Industry Standard Architecture (ISA), Low Pin Count (LPC), MicroChannel (MCA), Multibus, SBus, VMEbus and others.

Figure 2:
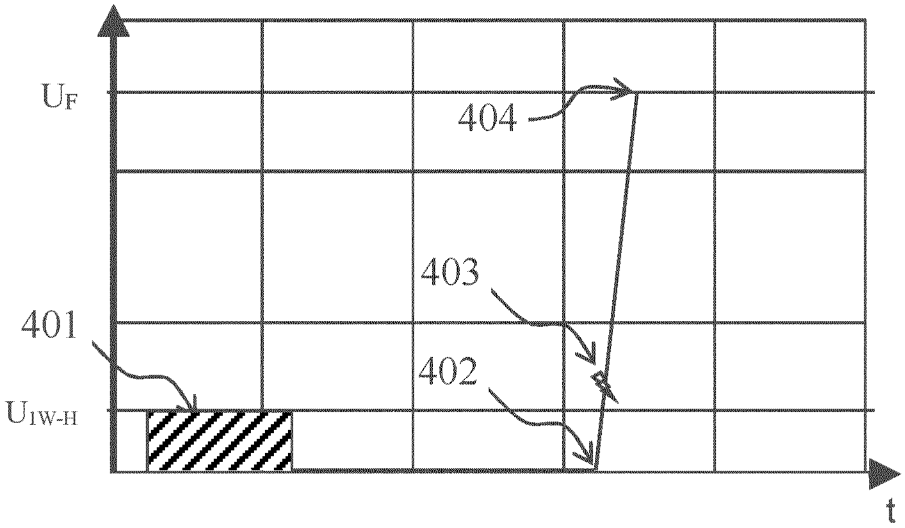
FIG. 2 shows schematically a time diagram with a waveform of a driver output signal according to various embodiments.

FIG. 2 shows schematically a time diagram with a waveform of a driver output signal according to various embodiments, as an example of a 1-Wire memory access before driving the light sources 121 of the luminaire module 120.

A 1-Wire memory access operation 401 is started whenever the driver 110 gets supply power. During the memory access operation 401, the signal voltage on the drive wires 112 is constraint to the 1-Wire operation range of a low voltage (e.g. 0V) to a high voltage $U_{1W\text{-}H}$ (e.g. 5V). If a 1-Wire component (i.e. the luminaire module 120) is active, its information can be transferred to a driver memory (not shown). After the driver 110 is informed about the required driving condition, the driver 110 can automatically select an appropriate nominal voltage and drive current for driving the light sources 121. Then, it starts increasing the voltage at time point 402. Thereafter, at a time point 403, the voltage exceeds the 1-Wire voltage range (i.e. 5V) and a trigger circuit (e.g. a fuse, switch or the like, as explained later) isolates the 1-Wire circuitry (e.g. interface circuit 131 and memory element 132) from the light sources 121 (e.g. LED string) of the luminaire module 120. Hence the driver 110 can now enter at time point 404 into a driving mode at a typical forward voltage $U_F$ higher than the 1-Wire voltage range.

An advantage of using 1-Wire technology on the luminaire module 120 is the inherent unique series number that is assigned to all 1-Wire components. This series number can be used to detect a change (e.g. replacement) of the luminaire module 120 and report the serial number after service action is completed.

Another advantage of using 1-Wire technology is that parallel connected luminaire modules 120 can be separately addressed (e.g. the 1-Wire luminaire modules 120 can be read out like in a DALI bus). Thereby, different drive parameters or other parameters of the parallel-connected luminaire modules 120 can be read independently. Thus, the driver 110 can determine how many luminaire modules 120 have been connected in parallel and whether or not forward voltages are compatible. If they are not compatible, a service message might be issued or simply only the compatible (e.g. lower voltage) luminaire modules can be activated so that service personal is able to see that a problem still exists.

Figure 3:
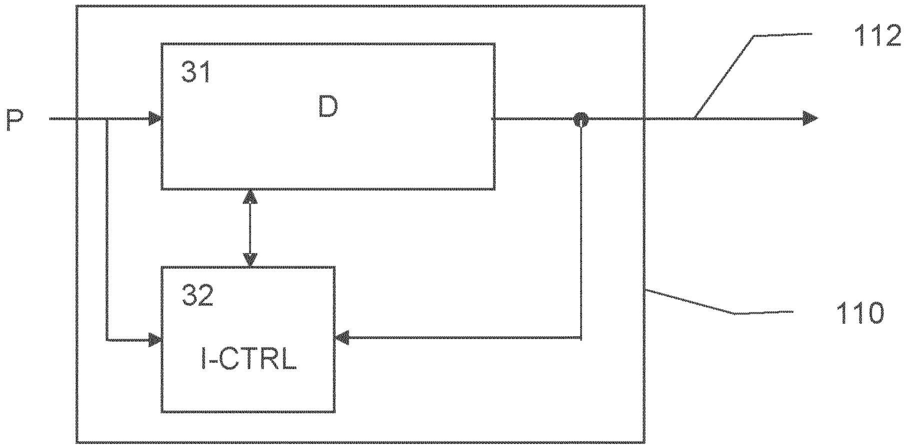
FIG. 3 shows schematically a block diagram of a driver according to various embodiments.

FIG. 3 shows schematically a block diagram of the driver 110 according to various embodiments.

The driver 110 comprises a driver circuit (D) 31 for generating a drive output to be supplied to the luminaire module 120 in order to activate and drive the light sources 121 according to their drive parameters stored in the memory element 132. The driver circuit 31 is configured as a controllable current source for providing sufficient current to light the light sources 121 of the luminaire module 120 at the required brightness, but to limit the current to prevent damaging the light sources 121. More complex current source circuits may be required for driving high-power light sources for illumination to achieve correct current regulation.

Furthermore, the driver 110 comprises an interface control circuit (I-CTRL) 32 which is configured (e.g. programmed) to access the memory element 132 via the interface circuit 131 e.g. by providing a 1-Wire master functionality and controlling the driver circuit 31 to provide the required 1-Wire signaling at the required voltage range (e.g. 0-5V). The interface control circuit 32 is connected to the drive wires 112 and configured to access the memory element 132 of the luminaire module 120 and to read data (including e.g. the drive parameters and other service parameters of the luminaire device 120) received from the memory element 132 of luminaire module 120 via the interface circuit 131 and the drive wires 112. The interface control circuit 32 may store the received drive parameters in a memory (not shown) of the driver 110 and supply the drive parameters to the driver circuit 31 (in case the drive circuit 31 has an own control circuit). Alternatively, the interface control circuit 32 may be configured to control the driver circuit 31 so as to provide the required drive output according to the received drive parameters via the drive wires 112 to the luminaire module 120.

Both driver circuit 31 and interface control circuit 32 receive their power supply P from a power supply circuit (not shown) internal or external to the driver 110. The interface control circuit 32 may be implemented as a programmable processor controlled by a software routine stored in a program memory.

Figure 4:
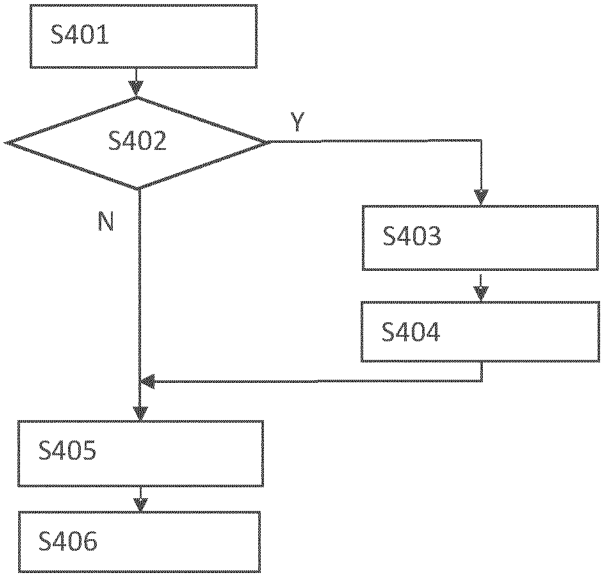
FIG. 4 shows a flow diagram of an enhanced luminaire driving procedure according to various embodiments.

FIG. 4 shows a flow diagram of an enhanced luminaire driving procedure according to various embodiments. This procedure may be implemented in the driver 110, e.g., by a software routine controlling the interface control circuit 32.

In step S401, bus connection lines (e.g. the drive wires 112) are accessed, e.g., by sending an own request and waiting for a response or by waiting for the receipt of an advertisement or other signaling from the luminaire module 120.

Then, in step S402, it is checked whether a luminaire device (e.g. the luminaire module 120) comprises an active low-voltage device (e.g. a 1-Wire device) that is connected to the bus connection lines, or if the active low-voltage device gives a "factory-new" response.

If so ("Y"), the procedure branches to step S403 and a memory (e.g. the memory element 132) of the low-voltage device is accessed and the stored drive parameters and/or other service parameters are read. In the subsequent step S404, the read parameters are used to select appropriate settings for driving the luminaire device. Then, the procedure continues with step S405 where the output voltage applied to the bus connection lines is increased to the drive voltage required for the luminaire device and the driving mode is entered in step S406.

Otherwise, if no active low-voltage device has been detected in step S402, or if the active low-voltage does not give a "factory-new" response, the procedure directly proceeds to steps S405 and S406 to increase the output voltage and enter the driving mode for the luminaire device.

In the following, examples for implementing an enhanced luminaire module 120 with low-voltage device (e.g. 1-Wire device) are explained with reference to FIGS. 5 to 8.

Figure 5:
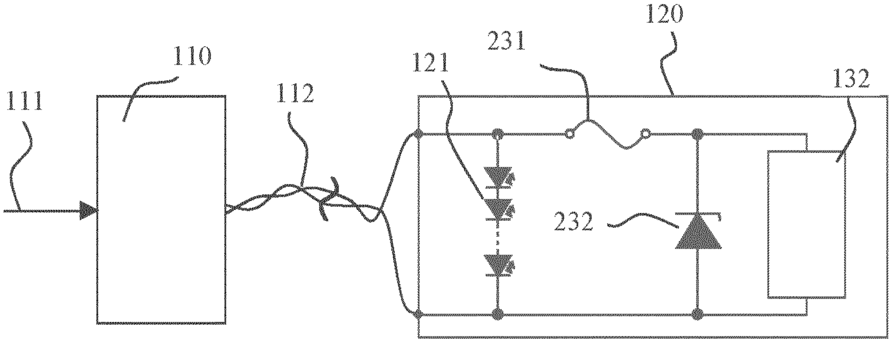
FIG. 5 shows schematically a block diagram of a first example of an enhanced luminaire module according to an embodiment.

FIG. 5 shows schematically a block diagram of a first example of an enhanced luminaire module according to an embodiment.

As in FIG. 1, the programmable memory element 132 is a 1-Wire low-voltage device and is added to the light sources 121 (e.g. series connection of LEDs) 221 on a luminaire module 120 (e.g. an L2 board).

In the first example, the interface circuit 131 of FIG. 1 is implemented by an exchangeable or resettable fuse 231 and a Zener diode 232 (with a Zener voltage of e.g. 5V) or other voltage-limiting element connected in parallel to the memory element 132.

Before the driver 110 drives the light sources 121 at the typical forward voltage $U_F$, a protocol signaling of the low-voltage device (e.g. 1-Wire protocol signaling) is executed by the driver 120, e.g., based on initial settings received via a user input 111. Here, the voltages of the protocol signaling is well below the typical forward voltage $U_F$, as indicated in FIG. 2. The start-up procedure of the driver 110 may always start with a period checking for an available 1-Wire component connected in parallel to the string of light sources 121. Such an access procedure before the normal drive operation is depicted in FIG. 2.

Due to the fact that the normal drive operation will break the fuse 231 the 1-Wire interface circuit needs to be reactivated, e.g. by replacing or resetting the fuse 231. Hence, when servicing the luminaire module 120 after the driver 110 has been exchanged, the fuse 231 can be replaced by a new fuse and the new driver can again access all important information with regard to the driving requirements of the luminaire module 120.

In a modification of the first example, the breakable or non-resettable one-way fuse 231 may beneficially be replaced by an automatically resettable type of fuse which opens the circuit once overcurrent is detected but connects the circuit again after cooling down. This may be e.g. a polymeric positive temperature coefficient (PTC) overcurrent protector placed in series with the circuit or assembly to be protected. The PTC element protects the circuit by changing from a low-resistance to a high-resistance state in response to an overcurrent. This function is called "tripping" of the overcurrent protection device.

Thus, the traditional fuse and the resettable PTC both function by reacting to the heat generated by the excessive current flow in the circuit. The fuse element melts open, interrupting the current flow, while the resettable PTC changes from low resistance to high resistance to limit current flow:

In this way, the memory element 132 can be accessed always before the luminaire driving mode is entered and no broken fuse needs to be replaced anymore.

In a further modification of the first example, the separation of low-voltage section (e.g. memory element 132)

from the high-voltage luminaire source may be achieved by a manual switch or a removeable jumper rather than the fuse 231. This keeps the driver 110 in reading mode until the switch or jumper is activated (e.g. flipped or pressed). Thus, service personal can easily set the luminaire module 120 into service mode manually.

Figure 6:
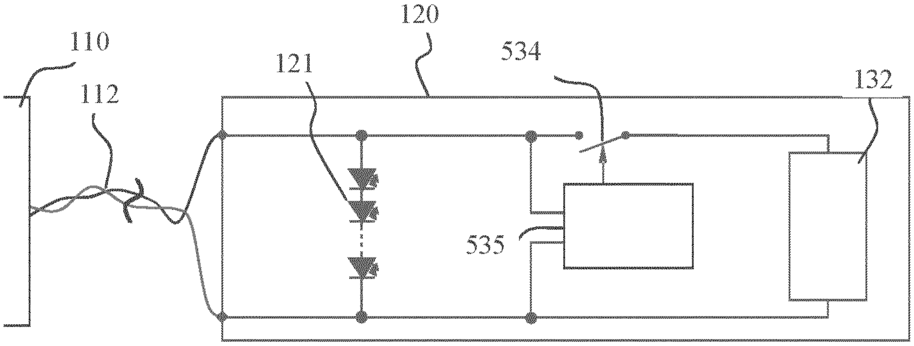
FIG. 6 shows schematically a block diagram of a second example of an enhanced luminaire module according to an embodiment.

FIG. 6 shows schematically a block diagram of a second example of an enhanced luminaire module according to an embodiment.

In the second example, the fuse 231 of the interface circuit is replaced by a voltage-dependent isolation circuitry which comprises e.g. a voltage-dependent control element 535 and an isolation switch 534 controlled by the voltage-dependent control element 535. The control element 535 is configured to close isolation switch 534 at low voltages (i.e. during access to the memory element 132) and to open the isolation switch 534 when a voltage above the 1-Wire high voltage $U_{1W\text{-}H}$ (e.g. 5V).

The voltage-dependent isolation circuitry may be implemented as an integrated circuit (e.g. eFuse) with integrated isolation switch, control circuit and power management.

An advantage of the second example is that the memory element 132 of such an enhanced luminaire module 120 can be accessed at any moment simply be switching to a lower voltage below the 1-Wire high voltage $U_{1W\text{-}H}$ (e.g. 5V). The driver 110 has then full control over the access to the memory element 132.

As an additional application, the memory element 132 can be used for regularly recording drive diagnostics and drive history of the luminaire module 120.

Figure 7:
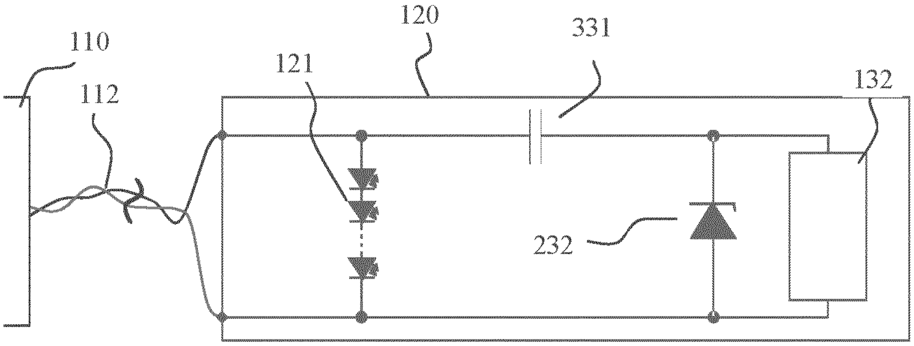
FIG. 7 shows schematically a block diagram of a third example of an enhanced luminaire module according to an embodiment.

FIG. 7 shows schematically a block diagram of a third example of an enhanced luminaire module according to an embodiment.

In the third example, the fuse 231 of the first example is replaced by a coupling capacitor 331. Thereby, memory element 132 of the luminaire module 120 is capacitively coupled to the output of the driver 110. This is a simple and inexpensive solution and is resettable. The capacitor 331 blocks the high DC driving voltage in the normal operating mode and protects the memory element 132. During service or access mode, the low-voltage AC protocol signaling for accessing the memory element 132 can be communicated over the capacitor 331 as interface circuit. The memory element 132 consumes very little current and might possibly be supplied by a voltage transition on the communication bus of the drive wires 112.

In a modification of the third example, the communication for retrieving lighting system related information (e.g. drive parameters etc.) from the memory element 132 may be achieved during the normal operating mode (luminaire driving mode) by superposing the protocol signaling on the DC driving voltage.

Figure 8:
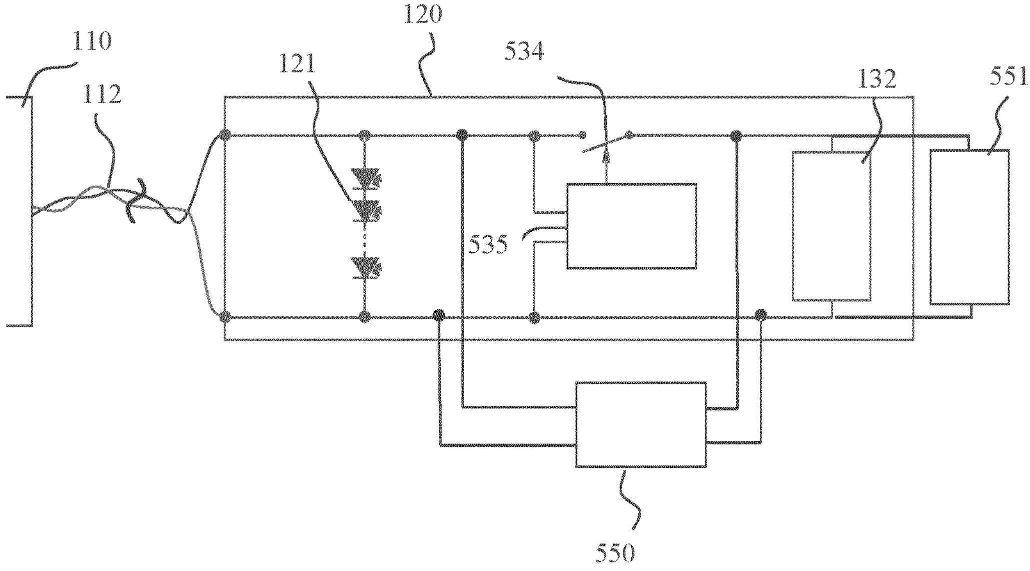
FIG. 8 shows schematically a block diagram of a fourth example of an enhanced luminaire module according to an embodiment.

FIG. 8 shows schematically a block diagram of a fourth example of an enhanced luminaire module according to an embodiment.

In the fourth example which is an enhancement of the second example, an auxiliary power supply 550 feeds the memory element 132 and a further circuitry 551 when the voltage-controlled isolation switch 534 is open. The further circuitry 551 may be a memory controller that can write to and/or read from the memory element 132.

According to the fourth example, the further circuitry 551 may comprise a wireless communication unit like e.g. an infrared (IR) unit, a Bluetooth (BT) unit or a nearfield communication (NFC) unit. The wireless communication unit may be configured to write information to (i.e. program) the memory element 132 that can be read by the driver 110 during the next start-up process. Furthermore, during the start-up process, the driver 110 can write information to the memory element 132 that can later be communicated outside the luminaire module 120 by the wireless communication unit of the further circuitry 551.

Luminaire modules (e.g. L2 boards) are well suited for placing wireless communication units thereon, because unlike e.g. drivers they are hardly shielded from the environment by housings or the like. Furthermore, the wireless communication unit of the further circuitry 551 can be upgraded when upgrading (e.g. replacing) the luminaire module 120.

In an alternative embodiment which may be based on the above first to fourth examples, the memory element 132 may store other lighting system related information besides the drive parameters (e.g. drive current and forward voltage). Such other lighting system related information may be luminaire module information like color temperature, production date, spectral details like color rendering index, expected lifetime, optical detail information like beam size and the like.

In a further developed embodiment, which may be based on the above first to fourth examples, the memory element 132 or the luminaire module 120 may also comprise a lifetime counter which may count e.g. an expired operation time (e.g. in hours) or a number of on/off cycles.

In a further developed embodiment, which may be based on the above first to fourth examples, the memory element 132 may also store lighting system related information like a spare part code (e.g. 12NC code) for specifying the luminaire module 120 and/or its components as spare parts, a global trade item number (GTIN), a unique instance code, a service tag or link to a specific website of an original equipment manufacturer (OEM).

In a further developed embodiment, which may be based on the above first to fourth examples, the driver 110 may write a copy of commissioning or set-up information in the memory element 132. At any driver defect, a newly installed driver can then automatically call up this commissioning or set-up information and seamlessly take over the role of the broken driver. In this way, repairing by exchange of the driver 110 does not require any new commissioning or adjustments. Such information my in addition comprise lamp identifiers, node names or IP addresses for networked lighting systems.

In a further developed embodiment, which may be based on the above first to fourth examples, the same interfacing and storing mechanism can be used for other modules in the luminaire. These can be sensors, communication modules and the like.

To summarize, an integration of a programmable memory device in a luminaire has been described. The memory device can be used to store service-related information such as drive parameters, repair history information and the like. The memory device can be read out by the same connectivity used for driving the luminaire, so that the driver can be informed about required operation conditions. The driver can thus learn about the service-related information before starting to drive the luminaire.

While the invention has been illustrated and described in detail in the drawings and foregoing description, such illustration and description are to be considered illustrative or exemplary and not restrictive. The invention is not limited to the disclosed embodiments. The proposed separation of and access to the programmable memory element 132 can be applied to and possibly standardized in any types of modules provided in luminaire devices that are driven by a driver.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described procedures like the one indicated in FIG. 4 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A luminaire module comprising:

a memory element for storing lighting system related information; and an interface circuit for providing access to the memory element for a driver of the luminaire module;

wherein the interface circuit is configured to provide access to the memory element by coupling the memory element to at least one connection line connectable to the driver, wherein the driver is for driving at least one light source of the luminaire module via the at least one connection line, wherein the interface circuit comprises an isolating element configured to isolate the memory element from the at least one light source during a driving mode for driving the at least one light source, wherein the lighting system related information comprises driving parameters for at least one of the luminaire module and the at least one light source.

2. The luminaire module of claim 1, wherein the memory element, the interface circuit and the at least one light source are connected in parallel.

3. The luminaire module of claim 2, wherein the isolating element comprises at least one of a fuse, a voltage-controlled switch and a coupling capacitor.

4. The luminaire module of claim 2, wherein the interface circuit comprises a voltage-limiting element connected in parallel to the memory element.

5. The luminaire module of claim 1, further comprising a wireless communication unit for writing wirelessly received information to the memory element or for wirelessly transmitting information read from the memory element.

6. The luminaire module of claim 1, wherein the memory element includes a 1-wire low-voltage device with a voltage range below the driving voltage of the driver.

7. A method of controlling a driver in a lighting system, comprising:

checking at least one connection line connecting the driver to a luminaire module for presence of an active memory element, wherein the driver is for driving at least one light source of the luminaire module via the at least one connection line; and setting the driver into a memory access mode for reading lighting system related information from the memory element via the at least one connection line in response to the checking result, wherein the lighting system related information comprises driving parameters for at least one of the luminaire module and the at least one light source.

8. A non-transitory computer readable medium comprising instructions, the instructions when executed by a processor of a computing device cause the processor to perform the method of claim 7.

* * * * *